United States Patent [19]
Bennett et al.

[11] Patent Number: 5,431,947
[45] Date of Patent: Jul. 11, 1995

[54] CONFECTIONERY FAT COMPOSITIONS

[75] Inventors: Jane C. Bennett, London, Great Britain; Frederick W. Cain, Voorburg, Netherlands; Geoffrey Talbot, Kempston, Great Britain

[73] Assignee: Unilever Patent Holdings B.V., Vlaardingen, Netherlands

[21] Appl. No.: 38,938

[22] Filed: Mar. 29, 1993

[30] Foreign Application Priority Data

Feb. 26, 1993 [EP] European Pat. Off. ............ 93301496

[51] Int. Cl.⁶ .............................................. A23D 9/00
[52] U.S. Cl. .................................. 426/607; 426/606; 426/608
[58] Field of Search ....................... 426/606, 607, 608

[56] References Cited

U.S. PATENT DOCUMENTS

| | | | |
|---|---|---|---|
| 2,972,541 | 2/1961 | Cochran | 426/606 |
| 3,361,568 | 1/1968 | Kidger | 426/606 |
| 4,061,798 | 12/1977 | Kanegae | 426/607 |
| 4,103,039 | 7/1978 | Mandai | 426/607 |
| 4,108,879 | 8/1978 | Minowa | 426/606 |
| 4,134,905 | 1/1979 | Hasman | 426/606 |
| 4,268,534 | 5/1981 | Kawada | 426/607 |
| 4,292,338 | 9/1981 | Ainger | 426/607 |
| 4,348,423 | 9/1982 | Pairaud | 426/607 |
| 4,610,889 | 9/1986 | Schmidt | 426/607 |
| 4,613,514 | 9/1986 | Maruzeni | 426/607 |
| 4,702,928 | 10/1987 | Wieske | 426/607 |
| 4,721,626 | 1/1988 | Rule | 426/607 |
| 4,873,109 | 10/1989 | Tanaka | 426/607 |
| 4,882,192 | 11/1989 | Maeda | 426/607 |
| 4,902,527 | 2/1990 | Galenkanip | 426/606 |
| 5,147,676 | 9/1992 | Talbot | 426/607 |
| 5,151,292 | 9/1992 | Zwikstra | 426/607 |
| 5,171,604 | 12/1992 | Weyland | 426/607 |
| 5,215,780 | 6/1993 | Meidenbauer | 426/606 |

*Primary Examiner*—Carolyn Paden
*Attorney, Agent, or Firm*—Cushman Darby & Cushman

[57] ABSTRACT

The invention concerns blends of fats A, B and C in the ranges:

5-30% of fat A;
>60% of fat B;
5-20% of fat C, wherein
fat A = fat having a $C_{SAFA}:C_{UNSAT}$ ratio = 0.5–1.3;
fat B = fat having >65 wt. % of SUS;
fat C = butterfat or a fraction therof.

12 Claims, No Drawings

CONFECTIONERY FAT COMPOSITIONS

FIELD OF THE INVENTION

In the preparation of confectionery products based on chocolate or chocolate-like materials, fats are applied that need tempering. Tempering is a time-consuming process wherein the temperature of the product is increased and decreased during time intervals to bring the cocoa butter and/or cocoa butter equivalent present in the confectionery fat into the desired stable crystal form in order to avoid, or at least inhibit, bloom formation of the fat in the confectionery product upon storage.

DESCRIPTION OF RELATED ART

Although it is known that addition of certain fat components to the cocoa butter or coco butter equivalent can decrease the tempering time, addition of these components so far led to the formation of chocolate(-like) products that were too soft at temperatures between 15° and 25° C. and/or that demonstrated bloom formation within 3 months' storage time.

Therefore, we have conducted a study to find out whether it would be possible to produce fat components based on cocoa butter and/or cocoa butter equivalents that could combine shorter tempering times with good product performance (=bloom and hardness).

SUMMARY OF THE INVENTION

The above-mentioned study has resulted in our invention. According to our invention fat compositions were found that are suitable for use in chocolate or chocolate-like materials comprising components A, B and C, wherein:

A = vegetable fat having a weight ratio between saturated fatty acid residues (= $C_{SAFA}$) and unsaturated fatty acid residues ($C_{UNSAT}$) ranging from 0.5–1.3, preferably from 0.7–1.1, $C_{SAFA}$ being the total of saturated fatty acid residues having 16 and 18 C atoms and the trans-mono-unsaturated residues having 18 C atoms, $C_{UNSAT}$ being the total of the cis-mono-unsaturated and di-unsaturated fatty acid residues having 18 C atoms, B = a fat having a SUS content greater than 65 wt. %, preferably greater than 80 wt. %;

S = saturated fatty acids having 16 or 18 C atoms;

U = mono-unsaturated fatty acids having 18–22 C atoms;

C = butterfat or a fraction thereof,

A, B and C being present in amounts of 5–30 wt. %, preferably 10–20 wt. % of A, more than 60 wt. %, preferably more than 70 wt. % of B, 5–20 wt. %, preferably 7–12 wt. % of C.

Very good results were obtained with compositions wherein fat A has an $N_{20}$ (unstab., NMR) of less than 25.

DETAILED DESCRIPTION OF THE INVENTION

Although fat A can be chosen from a wide variety of vegetable fats or mixtures of vegetable fats, we prefer to apply a fat A that has a SUS content of less than 55 wt. %, preferably less than 50 wt. % (S and U as defined above). Examples of such fats A are palm oil fractions, shea or shea fractions, mixtures of palm oil fractions and shea and/or hardened bean oil. Very suitable fats A can be obtained by blending a liquid oil D (other than fat B) having a ($U_2S+U_3$) content of more than 35 wt. %, preferably more than 50 wt. %, and a fat E having an $N_{20}$ (unstab., NMR) of more than 20, preferably more than 40.

Fat D can be a fat selected from the group consisting of palm oil, palm oil fractions, sunflower oil, rapeseed oil, high oleic rapeseed oil, fractions or mixtures thereof.

Fat E is preferably a trans-hardened fat having a melting point between 25° and 55° C.

Fat B is in fact the basic fat in the compositions according to the invention. Suitable fats B are cocoa butter and cocoa butter equivalents, such as palm oil mid-fractions, optionally mixed with shea or shea fractions and/or illipe. Fats based on synthetic, enzymically made cocoa butter equivalents rich in triglycerides of the POP, StOP and/or StOSt-type (P=palmitic, St=stearic, O=oleic) are also very suitable.

Fat C is butterfat or a fraction thereof. Suitable fats C are, e.g., butterfat, butter olein, butter stearin, but full cream milk powder is also an excellent butterfat source.

The tempering time mentioned above is defined as the time required to reach the right degree of temper according to the Greet test.

EXAMPLES

1. Products were made, using the following recipe:

|  | wt. % |
| --- | --- |
| Cocoa powder | 6.5 |
| Cocoa butter | 24.5 |
| Full milk cream powder* | 14.0 |
| Sugar | 50.0 |
| Fat** | 5.0 |

*FCMP is 25 wt. % of butterfat and 75 wt. % of non-fat milk solids.
**The fat applied was a mixture of palm oil olein and shea olein with $C_{SAFA}:C_{UNSAT}$ = 0.75; the SUS content was 39 wt. %.

The products were made, using a standard mixing-/conching/tempering procedure. The tempering was carried out in a Leatherhead Temper Vessel. The tempering time was measured. The products were stored at 15°, 20° and 25° C. Bloom, gloss and hardness were evaluated.

Results:

| Tempering time (min.) | 60 |
| --- | --- |
| Bloom } after | good |
| Gloss } 3 months |  |
| Hardness after 1 week |  |
| at 15° C. | 140 |
| at 20° C. | 110 |
| at 25° C. | 74 |

2. The above-mentioned results were compared with a standard chocolate composition with the following recipe:

|  | wt. % |
| --- | --- |
| Cocoa powder | 6.0 |
| Cocoa butter | 26.0 |
| FCMP | 28.0 |
| Sugar | 40.0 |

So this formulation does not contain our fat A component.

Results:

| | |
|---|---|
| Tempering time (min.) | 86 |
| Bloom } after | good |
| Gloss } 3 months | |
| Hardness after 1 week | |
| at 15° C. | 130 |
| at 20° C. | 100 |
| at 25° C. | 74. |

3. Example 1 was repeated, using a fat that was a mixture of palm oil, shea and medium-hardened soybean oil. $C_{SAFA}$: $C_{UNSAT}$=0.87; SUS content=41%.

The hardness of these products was measured after storage at 15° C. and at 15°/25° C. cycle.

Results after storage for 1 month:

| | 15° C. | 15/25° C. |
|---|---|---|
| Hardness | 130 | 155 |

Compared with products in similar recipe, however, using cocoa butter as fat:

| | 15° C. | 15/25° C. |
|---|---|---|
| Hardness | 185 | 222 |

So the reference products made in this way were far too hard while the products according to the invention had good hardness. The tempering times in these cases were about similar.

We claim:

1. A chocolate fat composition suitable for use in chocolate or chocolate-like materials comprising a mixture of components A, B and C, wherein:
   A is a vegetable fat having a weight ratio between saturated fatty acid residues $C_{SAFA}$ and unsaturated fatty acid residues $C_{UNSAT}$ ranging from 0.5–1.3,
   $C_{SAFA}$ being the total of saturated fatty acid residues having 16 and 18 C atoms and the trans-mono-unsaturated residues having 18 C atoms,
   $C_{UNSAT}$ being the total of the cis-mono-unsaturated and di-unsaturated fatty acid residues having 18 C atoms,
   B is a fat having a SUS content greater than 65 wt. % wherein:
     S represents saturated fatty acids having 16 or 18 C atoms;
     U represents mono-unsaturated fatty acid having 18–22 C atoms; and
   C is butterfat or a fraction thereof,
   A, B and C being present in amounts of 5–30 wt. % of A, more than 60 wt. % of B and 5–20 wt. % of C such that, when said composition is used in chocolate or chocolate-like materials, at least tempering or hardness properties, or both, are improved.

2. Fat composition according to claim 1 wherein fat A has an $N_{20}$ (unstab., NMR) of less than 25.

3. Fat composition according to claim 1, wherein fat A has a SUS content of less than 55 wt. %.

4. A fat composition according to claim 3 wherein the SUS content of fat A is less than 50 wt. %.

5. Fat composition according to claim 1, wherein fat B is coca butter or a cocoa butter equivalent.

6. A fat composition according to claim 1, wherein fat A is a blend of a liquid oil D other than fat B having a $(U_2S+U_3)$ content of more than 35 wt. % and a fat E having an $N_{20}$ (unstab. NMR) of more than 20.

7. Fat composition according to claim 6, wherein fat D is selected from the group consisting of palm oil, palm oil fractions, sunflower oil, rapeseed oil, high oleic rapeseed oil, fractions and mixtures thereof.

8. Fat composition according to claim 6, wherein fat E is a trans-hardened fat having a melting point between 25° and 55° C.

9. A fat composition according to claim 6 wherein liquid oil D has a $(U_2S+U_3)$ content of more than 50 wt. % and fat E has a $N_{20}$ of more than 40.

10. A fat composition according to claim 1 comprising 10–20 wt. % of A, more than 70 wt. % of B and 7–12 wt. % of C.

11. A chocolate composition comprising, as an additive thereto, a fat composition according to claim 1, said chocolate composition requiring reduced tempering time and demonstrating acceptable hardness and bloom inhibition on storage.

12. A composition according to claim 11 wherein:
   A is a mixture of palm oil olein and shear olein,
   B is cocoa butter and
   C is butter fat.

* * * * *